(12) United States Patent
Raphael et al.

(10) Patent No.: US 10,956,135 B1
(45) Date of Patent: Mar. 23, 2021

(54) ENFORCING POLICY IN DATAFLOWS

(71) Applicant: International Business Machines Corporation, Armonk, NY (US)

(72) Inventors: Roger C. Raphael, San Jose, CA (US); Rajesh M. Desai, San Jose, CA (US); Sonali Surange, San Rafael, CA (US); Hani Talal Jamjoon, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/599,415

(22) Filed: Oct. 11, 2019

(51) Int. Cl.
*G06F 9/44* (2018.01)
*G06F 8/41* (2018.01)
*G06N 5/02* (2006.01)
*G06F 8/34* (2018.01)

(52) U.S. Cl.
CPC .............. *G06F 8/433* (2013.01); *G06F 8/34* (2013.01); *G06N 5/02* (2013.01)

(58) Field of Classification Search
None
See application file for complete search history.

(56) References Cited

U.S. PATENT DOCUMENTS

| 5,650,948 | A | 7/1997 | Gafter | |
|---|---|---|---|---|
| 2004/0117772 | A1* | 6/2004 | Brand | G06F 11/3608 717/132 |
| 2016/0350656 | A1* | 12/2016 | Visvanathan | G06N 3/006 |
| 2016/0364650 | A1* | 12/2016 | Fletcher | G06N 5/046 |
| 2017/0286342 | A1* | 10/2017 | Derler | G06F 9/5066 |
| 2018/0069899 | A1* | 3/2018 | Lang | G06F 8/38 |
| 2018/0316692 | A1* | 11/2018 | David | H04L 63/20 |
| 2018/0349614 | A1 | 12/2018 | Ionescu et al. | |
| 2019/0190925 | A1* | 6/2019 | David | G06F 8/40 |
| 2019/0384604 | A1* | 12/2019 | Dehon | G06F 21/52 |
| 2020/0259868 | A1* | 8/2020 | Lang | H04L 63/0263 |

OTHER PUBLICATIONS

Castro et al., "Securing software by enforcing data-flow integrity," Microsoft.com, 2006 (Year: 2006).*

(Continued)

*Primary Examiner* — Insun Kang
(74) *Attorney, Agent, or Firm* — Yee & Associates, P.C.

(57) ABSTRACT

A method adapts a dataflow instance. A set of source data nodes, a set of terminal data nodes, and a set of computation nodes in the dataflow are identified from a directed graph. The set of computation nodes performs operations on data flowing from the set of source data nodes through computation nodes and onwards to terminal data nodes in the dataflow. The data nodes are evaluated with policies and a user context. A number of transformation compute nodes is computed from the policy decisions and added downstream of the set of source data nodes and optionally upstream of the set of terminal data nodes when the data, the dataflow or system does not meet the declared policies without the necessary computed number of transformation compute nodes. The number of transformation compute nodes are an additional portion of the overall set of computation nodes to enforce the declared policy.

17 Claims, 8 Drawing Sheets

(56) References Cited

OTHER PUBLICATIONS

Bhatkar et al., "Dataflow Anomaly Detection," 2006 IEEE Symposium on Security and Privacy, 15 pages.
Harvan et al., "State-based Usage Control Enforcement with Data Flow Tracking using System Call Interposition," 2009, Third International Conference on Network and System Security, 8 pages.
Jachner et al, "Data Flow Anomaly Detection," Jul. 1984, IEEE Transactions on Software Engineering, vol. SE-10, No. 4, pp. 432-437.
Reps et al., "Precise Interprocedural Dataflow Analysis via Graph Reachability," 1996, Theoretical Computer Science, vol. 167, Issues 1-2, 13 pages.
Seeger, "Using Control-Flow Techniques in a Security Context: A Survey on Common Prototypes and their Common Weakness," 2011 International Conference on Network Computing and Information Security, 5 pages.
Wei et al., "Amandroid: A Precise and General Inter-component Data Flow Analysis Framework for Security Vetting of Android Apps," Jan. 2018, ACM Trans. Priv. Sec. 1,1, Article 1, 31 pages.
Mell et al., "The NIST Definition of Cloud Computing," NIST Special Publication 800-145, 7 pages.

\* cited by examiner

US 10,956,135 B1

ENFORCING POLICY IN DATAFLOWS

BACKGROUND

1. Field

The disclosure relates generally to an improved computer system and, more specifically, to adapting a dataflow in a computer system. Still more particularly, the present disclosure relates to a method, apparatus, system, and computer program product for modifying a dataflow with an express intent to enforce one or more policies.

2. Description of the Related Art

Dataflow programming is a programming paradigm in which a user creates a dataflow representative of a higher-level goal of data processing of desired data inputs in which data outputs are produced as needed. A directed graph can be used to represent the dataflow created by the user. A directed graph is also referred to as a di-graph. The directed graph is comprised of nodes connected by edges in which the edges have a direction. With the directed graph representing dataflow, the directed graph includes source data nodes, computation nodes, and terminal data nodes.

A user can graphically select and place data nodes and computation nodes in a graphical user interface. The data nodes include one or more source data nodes and one or more terminal data nodes. The source data nodes feed data into the dataflow, and the terminal data nodes are the outputs of the dataflow. The computation nodes perform mathematical operations on the data. These nodes can be connected by edges to form the dataflow. For example, a user may create a directed graph for a dataflow to access a customer database for data about customers and group the customers by the data, such as zip codes.

SUMMARY

According to one embodiment of the present invention, a method for adapting a dataflow. A set of source data nodes, a set of terminal data nodes, and a set of computation nodes located between the set of source data nodes and the set of terminal data nodes in the dataflow is identified by a computer system from a directed graph representing the dataflow, wherein the set of computation nodes performs operations on data flowing from the set of source data nodes in the dataflow. The dataflow with one or more policies, at least one of a source data node in the set of source data nodes or a terminal data node in the set of terminal data nodes, and a user context is evaluated, by the computer system, with one or more policies and a user context. A number of transformation compute nodes is added in a number of locations selected from at least one of downstream of the source data node in the set of source data nodes or upstream of the terminal data node in the set of terminal data nodes in the dataflow by the computer system when the dataflow does not meet the one or more policies without an addition of the number of transformation compute nodes, wherein the number of transformation compute nodes are a portion of the set of computation nodes that perform the operations on the data to enforce the one or more policies for the computer system.

According to another embodiment of the present invention a policy enforcement system comprises a computer system that operates to identify, a set of source data nodes, a set of terminal data nodes, a set of computation nodes located between the set of source data nodes and the set of terminal data nodes in the dataflow from a directed graph representing the dataflow, wherein the set of computation nodes performs operations on data flowing from the set of source data nodes in the dataflow. The computer system operates to evaluate at least one of a source data node in the set of source data nodes or a terminal data node in the set of terminal data nodes in the dataflow with one or more policies and a user context and add a number of transformation compute nodes in a number of locations selected from at least one of downstream of the source data node in the set of source data nodes or upstream of the terminal data node in the set of terminal data nodes in the dataflow when the dataflow does not meet the one or more policies without an addition of the number of transformation compute nodes. The number of transformation compute nodes are a portion of the set of computation nodes that perform the operations on the data to enforce the one or more policies for the computer system.

According to yet another embodiment of the present invention, a computer program product for adapting a dataflow comprises a computer-readable-storage media with first program code, second program code, and third program code stored on the computer-readable storage media. First program code is executed for identifying a set of source data nodes, a set of terminal data nodes, and a set of computation nodes located between the set of source data nodes and the set of terminal data nodes in the dataflow from a directed graph representing the dataflow, wherein the set of computation nodes performs operations on data flowing from the set of source data nodes in the dataflow. Second program code is executed for evaluating at least one of the source data node in the set of source data nodes or the terminal data node in the set of terminal data nodes in the dataflow with one or more policies and a user context. Third program code is executed for adding a number of transformation compute nodes in a number of locations selected from at least one of downstream of the source data node in the set of source data nodes or upstream of the terminal data node in the set of terminal data nodes in the dataflow when the dataflow does not meet the one or more policies without an addition of the number of transformation compute nodes, wherein the number of transformation compute nodes are a portion of the set of computation nodes that perform the operations on the data to enforce the one or more policies for the computer system.

DETAILED DESCRIPTION

Figure 1:
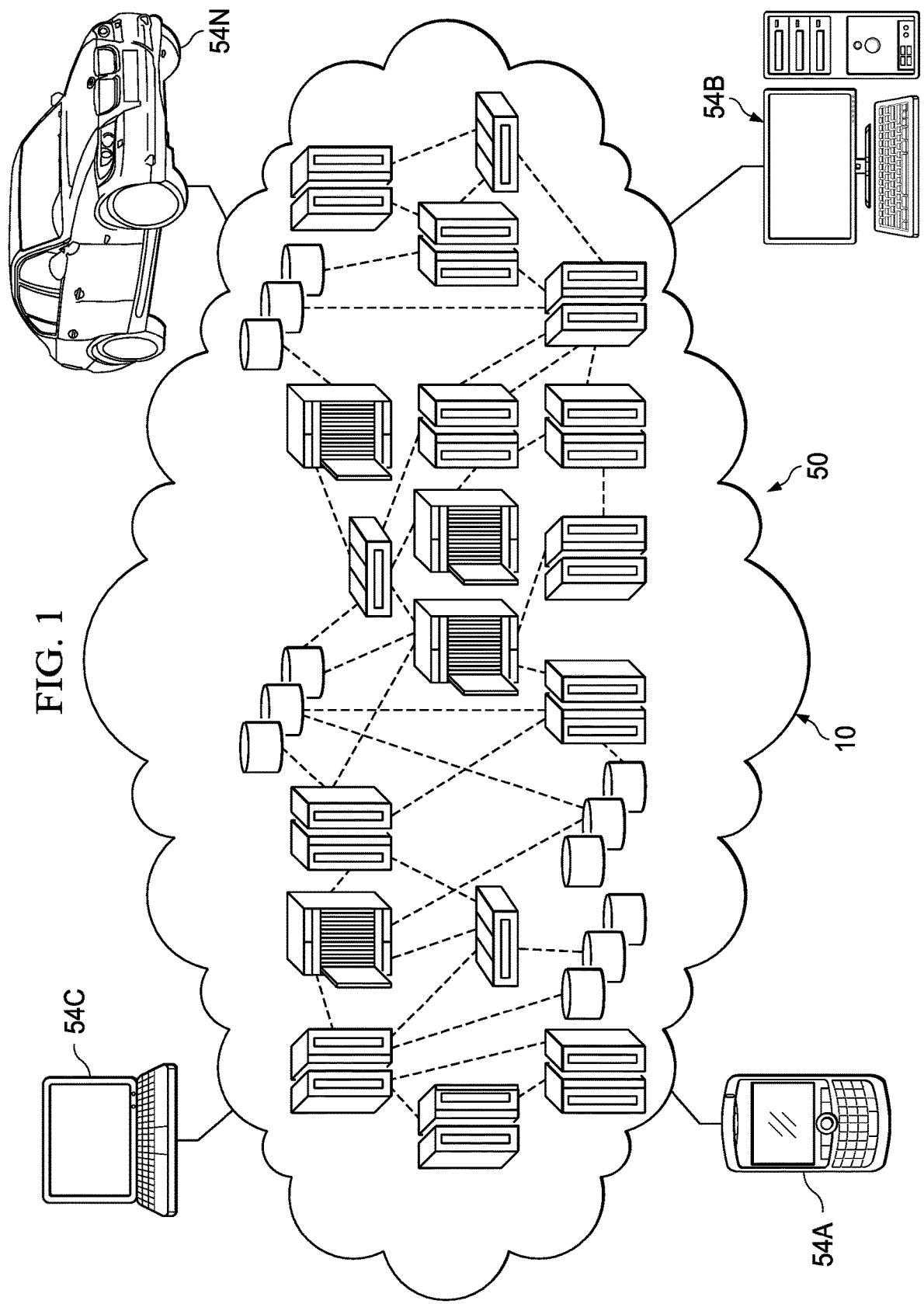
FIG. 1 is a cloud computing environment in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. For example, the illustrative embodiments recognize and take into account that, currently, a user may not take into account policies regarding security, confidentiality, or other rules in designing a dataflow. The illustrative embodiments recognize and take into account that data sources are often selected but have not been processed to take into account a policy. Further, the illustrative embodiments recognize and take into account that preprocessing the data in a data source for use to meet a policy can be more time-consuming than desired. The illustrative embodiments recognize and take into account that the time spent and processing resources used can increase greatly as the number of data sources increases. Further, the illustrative embodiments recognize and take into account that, in addition to being time-consuming, the preprocessing of data in data sources can distract a user from a primary task of creating a desired dataflow.

Therefore, the illustrative embodiments recognize and take into account that it would be desirable to have a method and apparatus that take into account at least some of the issues discussed above, as well as other possible issues. For example, the illustrative embodiments recognize and take into account that when data protection, security, privacy and other policies are to be enforced, an ability to work within the dataflow model itself is desirable to avoid a preprocessing step that prepares inputs to the dataflow. The illustrative embodiments recognize and take into account that an ability to automatically adjust an instance of a dataflow for each case in which different users and datasets may be subject to different policies is desirable.

Thus, the illustrative embodiments provide a method, apparatus, system, and computer program product for reworking dataflow to include nodes that operate to enforce a policy in the dataflow such that the enforcement of the policy occurs inline with the dataflow execution. In one illustrative example, a method adapts a dataflow to enforce a policy. A computer system identifies a set of source data nodes, a set of terminal data nodes, and a set of computation nodes located between the set of source data nodes and the set of terminal data nodes in the dataflow from a directed graph representing the dataflow. The computer system evaluates at least one of the source data node in the set of source data nodes or the terminal data node in the set of terminal data nodes in the dataflow with the policy and the user context The computer system adds a number of transformation compute nodes in the dataflow with one or more policies, at least one of a source data node in the set of source data nodes or a terminal data node in the set of terminal data nodes in the dataflow when the dataflow does not meet the policy without an addition of the number of transformation compute nodes. The number of transformation compute nodes are a portion of the computation nodes that perform the operations on the data to enforce the policy for the computer system.

As used herein, "a set of," when used with reference to items, means one or more items. For example, "a set of source data nodes" is one or more source data nodes.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
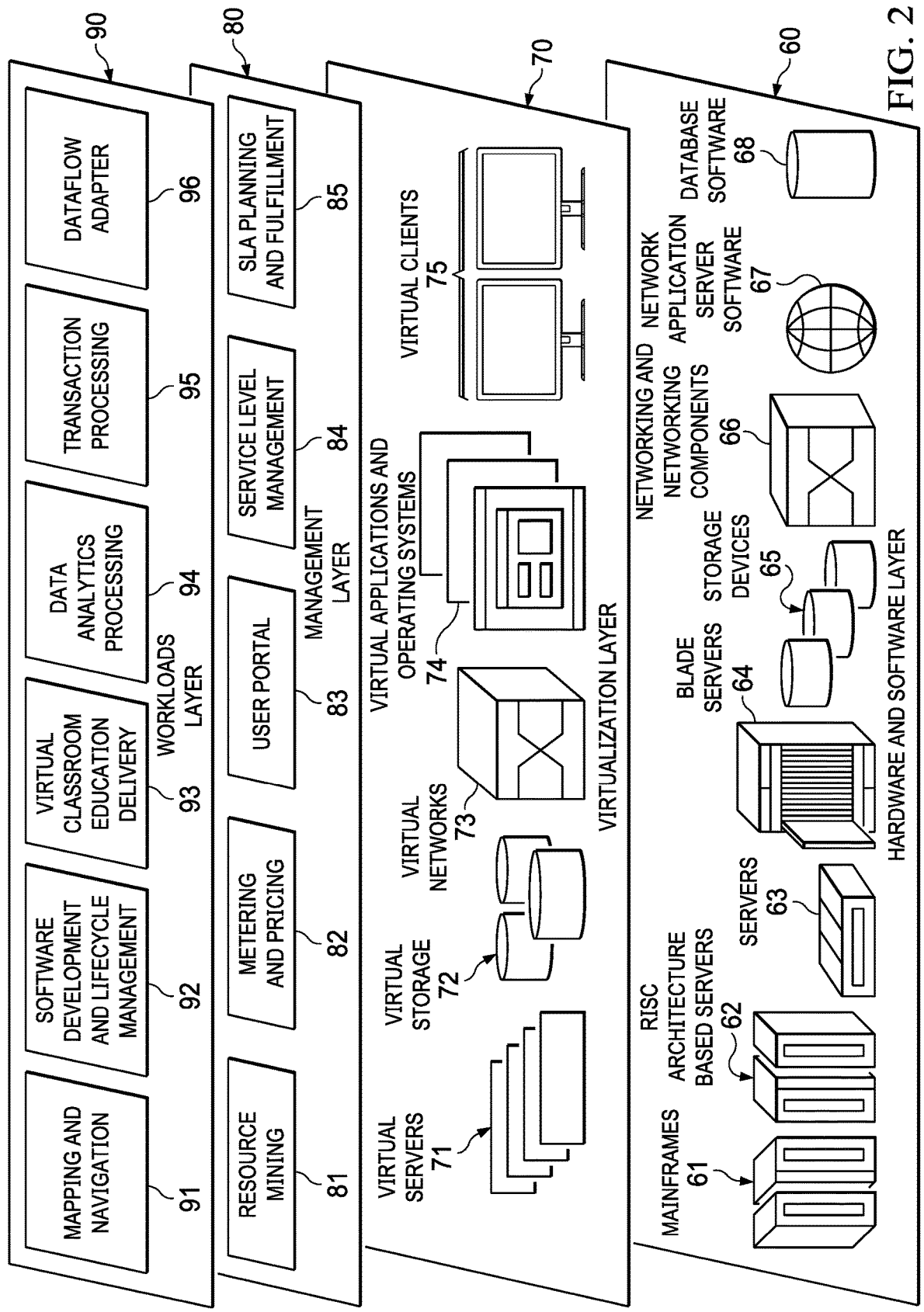
FIG. 2 is a set of abstraction model layers in accordance with an illustrative embodiment.

Referring now to FIG. 2, a set of functional abstraction layers provided by cloud computing environment 50 in FIG. 1 is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dataflow adapter 96.

Figure 3:
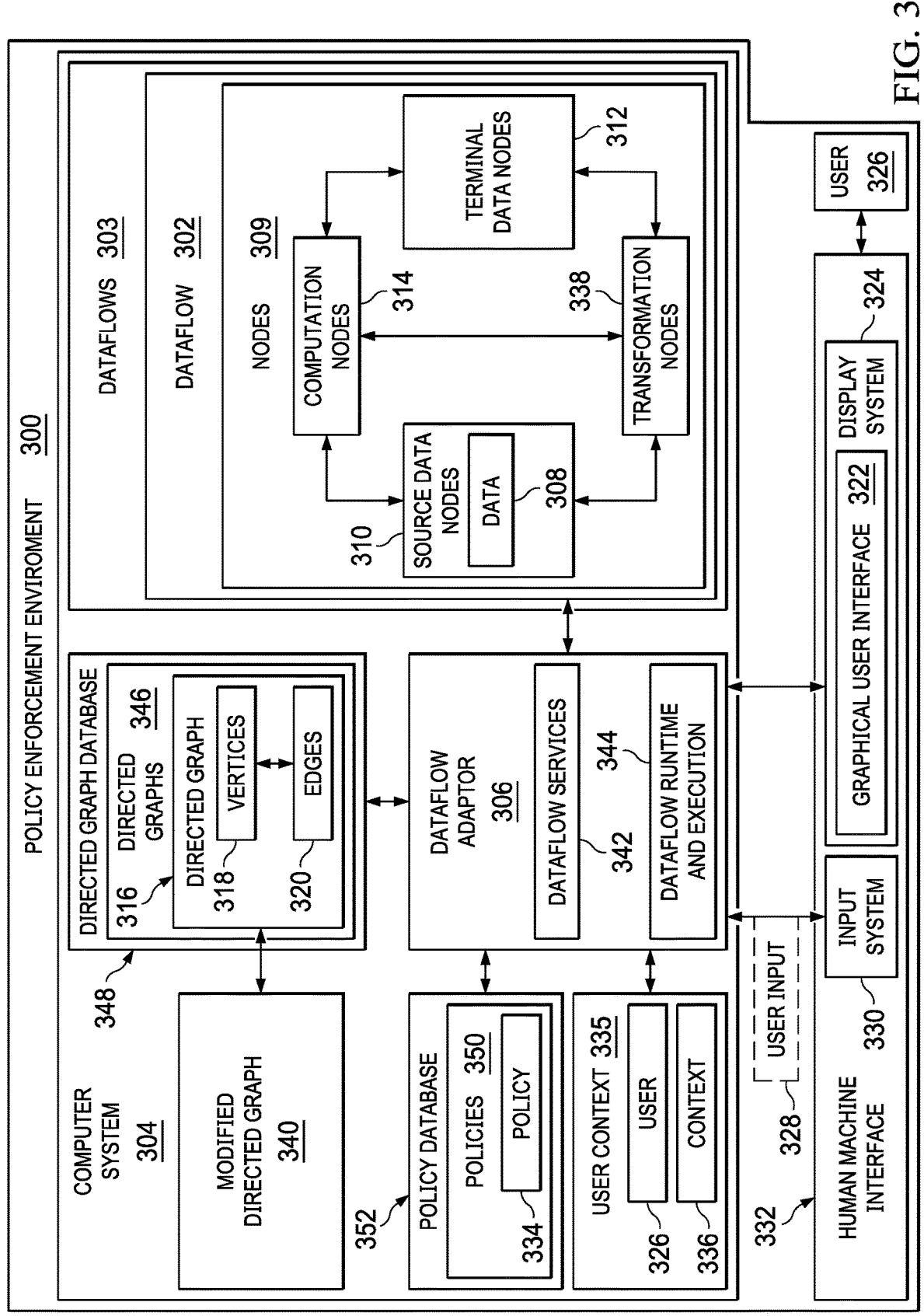
FIG. 3 is an illustration of a policy enforcement environment in accordance with an illustrative embodiment.

With reference to FIG. 3, an illustration of a policy enforcement environment is depicted in accordance with an illustrative embodiment. As depicted, policy enforcement environment 300 is an environment in which dataflow 302 can be designed, run, or both designed and run in computer system 304. Dataflow 302 is one of dataflows 303 that can be executed in computer system 304. In this illustrative example, dataflow adapter 306 in computer system 304 manages at least one of the designing and execution of dataflow 302 in computer system 304.

For example, dataflow adapter 306 includes dataflow services 342. In this illustrative example, dataflow services 342 provide a user interface such as graphical user interface 322 for user 326 to create or modify dataflows such as dataflow 302. User 326 can be, for example, a data analyst or a data scientist that builds applications using a dataflow designer and asset data. Some of the application types might be reports for a building application, a data mining application, or other suitable types of applications. User 326 can use dataflows as the runtime to execute the designed dataflows.

As depicted, dataflow adapter 306 also includes dataflow runtime and execution 344. This component provides a process for running dataflow 302 in computer system 304.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Dataflow adapter 306 can be implemented in software, hardware, firmware, or a combination thereof. When software is used, the operations performed by dataflow adapter 306 can be implemented in program code configured to run on hardware, such as a processor unit. When firmware is used, the operations performed by dataflow adapter 306 can be implemented in program code and data and stored in persistent memory to run on a processor unit. When hardware is employed, the hardware may include circuits that operate to perform the operations in dataflow adapter 306.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 304 is a physical hardware system and includes one or more data processing systems. When more than one data processing system is present in computer system 304, those data processing systems are in communication with each other using a communications medium. The communications medium can be a network. The data processing systems can be selected from at least one of a computer, a server computer, a tablet computer, or some other suitable data processing system.

In this illustrative example, dataflow 302 involves the flow of data 308 through nodes 309. For example, data 308 can flow from set of source data nodes 310 to a set of terminal data nodes 312 in nodes 309. As depicted, the set of source data nodes 310 is a set of information assets. A source data node is a source of information and can be, for example, an information asset in a catalog in a cloud system. The information asset can include information selected from at least one of user defined information, system generated information, metadata about the information asset, a pointer to actual rectangular data such as static data stored in a database or a file system, or other suitable types of information.

In this illustrative example, a source data node in the set of source data nodes 310 is a source of data 308 in dataflow 302. Data 308 flows through a set of computation nodes 314 to terminal data nodes 312. A source data node can be a process that produces data 308 or can be a data structure that stores data 308. For example, a source data node can be any process that produces data tuple by tuple with an analyzable static or dynamic schema. As another example, a source data node can be static data stored in a database, a file system, or an object store. In yet another example, a source data node can be a device that generates dynamic data such as data produced at the edge of an IOT hub. As another example, a source data node can be a hardware component such as a weather station producing stream data types representing local weather samples including information such as temperature, pressure, humidity, and other information about the weather.

As depicted, a terminal data node in the set of terminal data nodes 312 is a data structure or process that consumes or uses data 308 received in dataflow 302. A terminal data node can be, for example, an information asset in a catalog, a database, a document, a table, or other data structure.

In the illustrative example, a computation node in the set of computation nodes 314 comprises one or more processes that performs operations on data 308 as data 308 flows through the computation node towards the set of terminal data nodes 312. For example, a computation node can be at least one of a software process or hardware that receives and processes a single tuple of data with a function that produces a new tuple that is output downstream. A computation node can process edge data or data on a disk. Data 308 can be processed by a computation node as an aggregation of data accumulating selected attributes of data. A computation node can be, for example, an aggregator node, a condition trigger node, a bulk processing node that outputs related tuples of data, or other suitable types of nodes that perform operations on data 308.

In this illustrative example, the set of source data nodes 310, the set of computation nodes 314, and the set of terminal data nodes 312 are represented using directed graph 316. Directed graph 316 is a data structure in which vertices 318 are connected to each other by edges 320. As depicted, the set of source data nodes 310, the set of computation nodes 314, and the set of terminal data nodes 312 are processes or data structures in computer system 304 that are represented in directed graph 316 by vertices 318. The flow of data 308 between these nodes are represented by edges 320.

Additionally, directed graph 316 can also be displayed in graphical user interface 322 on display system 324 for computer system 304 by dataflow adapter 306. Display system 324 is a physical hardware system and includes one or more display devices on which graphical user interface 322 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

In this example, user 326 is a person that can interact with graphical user interface 322 through user input 328 generated by input system 330 for computer system 304. Input system 330 is a physical hardware system and can be selected from at least one of a mouse, a keyboard, a trackball, a touchscreen, a stylus, a motion sensing input device, a cyber glove, or some other suitable type of input device. Display system 324 and input system 330 form human machine interface 332.

As depicted, user 326 can interact with dataflow adapter 306 to create directed graph 316 representing dataflow 302 in computer system 304 through graphical user interface 322. In other illustrative examples, a set of application program interfaces (APIs) or some other type of interface can be used in place of or in addition to graphical user interface 322. Directed graph 316 contains a logical representation of nodes 309 in dataflow 302. For example, a set of source data nodes 310, a set of computation nodes 314, and a set of terminal data nodes 312 are logically represented as vertices 318 in directed graph 316.

After dataflow 302 has been designed, dataflow 302 can be executed in computer system 304 using a set of source data nodes 310, a set of computation nodes 314, and a set of terminal data nodes 312 in directed graph 316. Dataflow adapter 306 can select interconnects between nodes 309 using edges 320 as represented in directed graph 316.

Additionally, dataflow adapter 306 operates to enforce policy 334 with respect to data 308 in the set of source data nodes 310. Policy 334 is one or more of policies 350 in policy database 352. Policy 334 is one or more rules that can be applied to data 308. Policy 334 can take a number of different forms. For example, policy 334 can relate to at least one of security, computer resource usage, privacy, confidentiality, a company policy, or some other type of policy. As depicted, policy 334 can be set out by a chief data officer (CDO) in an organization, a government entity, or some other group or organization.

As depicted, dataflow adapter 306 can dynamically modify dataflow 302 as represented in directed graph 316 to enforce policy 334. The modification can be performed at runtime when user context 335 is known for dataflow 302. For example, user context 335 can include user 326 requesting data 308 and context 336 for the connection. In this illustrative example, context 336 is information about a connection to dataflow 302 from the set of terminal data nodes 312. The information about the connection can context information about the connection. For example, the context information can include at least one of a physical location of the connection, a default location, a connection type, or other suitable information that provides context to the connection.

This information is known at runtime when user 326 requests data 308. This modification of dataflow 302 occurs without a need to preprocess data 308 in the set of source data nodes 310 before data 308 is sent into dataflow 302 from the set of source data nodes 310. The modification of dataflow 302 is also referred to as rewriting dataflow 302.

In the illustrative example, dataflow adapter 306 identifies the set of source data nodes 310 in directed graph 316 representing dataflow 302. The set of computation nodes 314, located between the set of source data nodes 310 and the set of terminal data nodes 312 in the dataflow, performs operations on data 308 flowing from the set of source data nodes 310 in dataflow 302.

Additionally, dataflow adapter 306 can evaluate at least one of a source data node in the set of source data nodes 310 or a terminal data node in the set of terminal data nodes 312 in dataflow 302 with policy 334 and user context 335. For example, if policy 334 is a security policy, the application of policy 334 can result in identifying a need to encrypt, anonymize, or otherwise protect data 308.

Further, policy 334 can also take into account other factors in addition to the set of source data nodes 310. For example, dataflow adapter 306 can evaluate at least one of a source data node in the set of source data nodes 310 or the terminal data node 312 in the set of terminal data nodes in dataflow 302 with respect to the set of source data nodes 310 and the set of terminal data nodes 312 identified in directed graph 316.

Dataflow adapter 306 can add a number of transformation compute nodes 338 between the set of source data nodes 310 and the set of terminal data nodes 312 in the dataflow when the dataflow does not meet the policy. The number of transformation compute nodes 338 is a portion of the set of computation nodes 314 that performs the operations on data 308 to enforce policy 334 for dataflow 302.

As used herein, "a number of," when used with reference to items, means one or more items. For example, "a number of transformation compute nodes 338" is one or more of transformation compute nodes 338.

In one illustrative example, directed graph 316 representing dataflow 302 can be stored until dataflow 302 is to be executed. At runtime, before execution of dataflow 302, dataflow run time and execution 344 in dataflow adapter 306 can operate to transform directed graph 316 represented in dataflow 302 into a runtime version price of components selected for nodes 309 represented in directed graph 316. For example, dataflow runtime and execution 344 in dataflow adapter 306 identifies the set of source data nodes 310 in directed graph 316; applies policy 334 to the set of source data nodes identified in the directed graph; and adds the number of transformation compute nodes 338 between the set of source data nodes 310 and the set of terminal data nodes 312 in dataflow 302 when dataflow 302 does not meet policy 334 without an addition of the number of transformation compute nodes 338.

In processing directed graph 316 at runtime before execution of dataflow 302, the addition of the number of transformation compute nodes 338 can also be logically represented as vertices 318 in directed graph 316 representing dataflow 302. This modified dataflow in directed graph 316 now enforces policy 334, and directed graph 316 with the number of transformation compute nodes 338 is referred to as modified directed graph 340.

In the illustrative example, dataflow adapter 306 uses modified directed graph 340 to identify components in computer system 304 to implement the set of source data nodes 310, the set of computation nodes 314, the number of transformation compute nodes 338, and the set of terminal data nodes 312. The connections between the components identified for dataflow 302 are based on the edges in modified directed graph 340.

In another illustrative example, dataflow adapter 306 can use directed graph 316 to identify components in computer system 304 to implement the set of source data nodes 310, the set of computation nodes 314, and the set of terminal data nodes 312 in computer system 304. Dataflow adapter 306 can then evaluate at least one of a source data node in the set of source data nodes 310 or a terminal data node in the set of terminal data nodes 312 in dataflow 302 using policy 334 and user context 335 and add the components and connections for the number of transformation compute nodes 338 between the set of source data nodes 310 and the set of terminal data nodes 312 to enforce policy 334.

The components in the illustrative examples are components in computer system 304. The components can be selected from at least one of a hardware component or a software component. When the components are identified and connections between the components are established, dataflow adapter 306 can execute dataflow 302. In this example, data 308 is processed by the number of transformation compute nodes 338 such that policy 334 is enforced with respect to data 308. Also, preprocessing of data 308 in the set of source data nodes 310 is unnecessary.

In the illustrative example, directed graph 316 can be stored with other directed graphs 346 in directed graph database 348. Directed graphs 346 represent dataflows 303 that can be executed in computer system 304. A directed graph for a desired dataflow can be selected by user 326 for execution from dataflow database 348. The selected directed graph for the desired dataflow can be processed as described for directed graph 316 to enforce one or more policies that are in effect for computer system 304 at the time that the desired dataflow is executed. In this manner, additions, updates, removals, modifications, or other changes to policies 350 in policy database 352 can be made without a need to revise or update directed graphs 346 in directed graph database 348 for dataflows 303 that may be executed in computer system 304. In the illustrative example, dataflow adapter 306 enforces polices 350 in policy database 352 that are in effect in computer system 304 on dataflow 302 at runtime prior to execution of dataflow 302.

In one illustrative example, one or more solutions are present that overcome a problem with enforcing policies in a computer system. For example, an illustrative example can enforce polices such as those relating to data protection, security, privacy, and other policies in a manner that does not require user input and avoids a preprocessing step that prepares inputs to the dataflow. Further, the illustrative example automatically adjusts a dataflow based on the use of the dataflow for different users, and datasets may be subject to different policies. The illustrative example also reduces the time and effort needed to enforce polices that may change over time through automatically modifying a dataflow at runtime prior to execution of the dataflow to take into account one or more polices that are in effect at the time the dataflow is executed.

Computer system 304 can be configured to perform at least one of the steps, operations, or actions described in the different illustrative examples using software, hardware, firmware, or a combination thereof. As a result, computer system 304 operates as a special purpose computer system in which dataflow adapter 306 in computer system 304 enables automatically enforcing polices in computer system 304. In particular, dataflow adapter 306 transforms computer system 304 into a special purpose computer system as compared to currently available general computer systems that do not have dataflow adapter 306.

In the illustrative example, the use of dataflow adapter 306 in computer system 304 integrates processes into a practical application for a method for adapting a dataflow in a manner that increases the performance of computer system 304. The increase in performance includes, for example, increasing at least one of security, privacy, or other goals for computer system 304. In other words, dataflow adapter 306 in computer system 304 is directed to a practical application of processes integrated into dataflow adapter 306 in computer system 304 that automatically analyzes a dataflow at runtime and adds transformation compute nodes as needed to enforce a policy. In this illustrative example, dataflow adapter 306 in computer system 304 also reduces workloads on uses of dataflows by not requiring a user to take into account one or more policies that may be in effect for computer system 304 used by the user to execute a dataflow.

The illustration of policy enforcement environment 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, only policy 334 is described as being enforced on dataflow 302. One or more of polices 350 in addition to or in place of policy 334 can be enforced on dataflow 302 based on an analysis of dataflow 302. As another example, one or more dataflows can be processed by dataflow adapter 306 for execution in addition to dataflow 302 by one or more users in addition to or in place of user 326.

Figure 4:
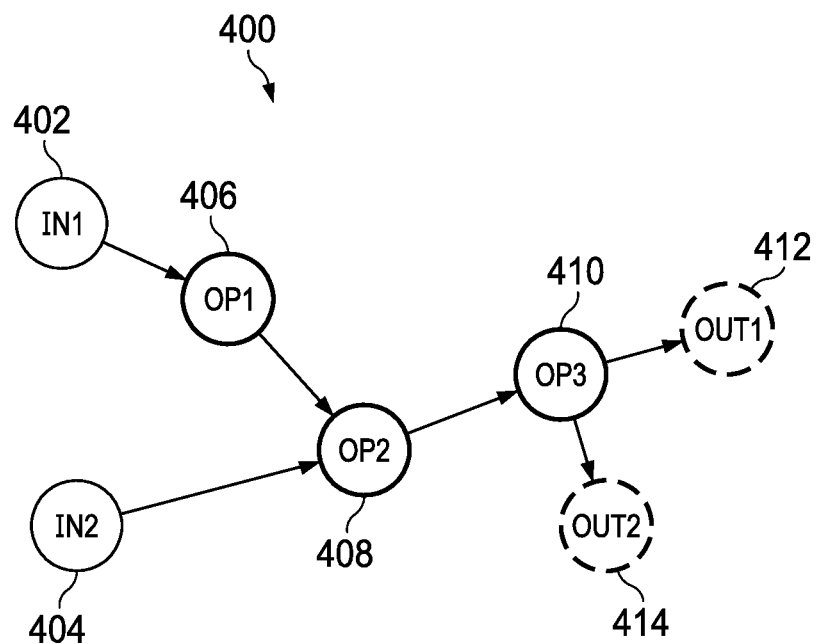
FIG. 4 is an illustration of a dataflow in a computer system in accordance with an illustrative embodiment.

With reference next to FIG. 4, an illustration of a dataflow in a computer system is depicted in accordance with an illustrative embodiment. In this illustrative example, dataflow 400 is an example of one implementation for dataflow 302 in FIG. 3. In this illustrative example, dataflow 400 comprises IN1 node 402 and IN2 node 404. These two nodes are examples of source data nodes 310 in FIG. 3. Dataflow 400 also includes OUT1 node 412 and OUT2 node 414, which are examples of terminal data nodes 312 in FIG. 3. As depicted, OP1 node 406, OP2 node 408, and OP3 node 410 are examples of computation nodes 314 in FIG. 3.

In this depicted example, dataflow 400 is shown to illustrate an example of nodes. Further, this figure also shows how dataflow 400 can be displayed in graphical user interface 322 in FIG. 3. However, this depiction of dataflow 400 in FIG. 4 does not require the display of these nodes in graphical user interface 322 in FIG. 3 or some other interface as part of a process for analyzing dataflow and rewriting dataflow to enforce a policy. In this depicted example, dataflow 400 is a dataflow selected by a user for execution.

In this illustrative example, data such as data sets in IN1 402 and IN2 404 are curated but have not necessarily been processed such that the data in these source data nodes meets a policy. These data sets flow through OP1 node 406, OP2 node 408, and OP3 node 410 to reach OUT1 node 412 and OUT2 node 414. As depicted, the data set IN1 in IN1 node 402 flows through OP1 node 406, OP2 node 408, and OP3 node 410, to reach OUT1 node 412 and OUT2 node 414. The data set IN2 in IN2 node 404 flows through OP2 node 408 and OP3 node 410 to reach OUT1 node 412 and OUT2 node 414.

At one time, a policy can be applied to dataflow 400. In this illustrative example, the policy can be, for example, a privacy and security policy for an organization. This policy can be enforced at the time at which data set IN1 and data set IN2 are to be processed soon. In this illustrative example, the application of the policy can be performed against data set IN1 and data set IN2. This application of the policy can be performed with the knowledge of a user who will receive the data processed by dataflow 400 and the context for dataflow 400. The context is information about the connection for OUT1 node 412 and OUT2 node 414. In other illustrative examples, the connection can be a user device that connects to at least one of OUT1 node 412 and OUT2 node 414. In other illustrative examples, at least one of OUT1 node 412 or OUT2 node 414 can store the data as information assets in a catalog. In another example, at least one of OUT1 node 412 or OUT2 414 can be a computer that prints a report on an output device such as a printer.

As depicted, the policy is applied to each of the source data nodes, OUT1 node 412 and OUT2 node 414, to generate an enforcement decision. The enforcement decision can be to allow used data from a source data node, deny data from being used from the source data node, or to transform the data to enforce the policy.

Further, each source data node can also be analyzed to determine whether a cross-vulnerability is present between common data sets. Common data sets are data sets that reference each other based on a key. With a common data set, a key in one data set can be used to access information in another data set.

For example, a primary key in a table in a database in a source data node can be used to access information. A foreign key in another table in the database can reference the primary key. In this instance, a link is present between the two tables. The link between the two tables can result in a cross-vulnerability in which information can be accessed by a foreign key that does not meet a policy.

The process can identify common data sets with cross-vulnerabilities. For example, data set IN1 is a table that contains social security numbers, zip codes, and customer IDs. Data set IN2 is a table that includes customer IDs and income information. In data set IN1, the customer IDs are foreign keys and in data set IN2, the customer IDs are primary keys. A primary key in a table in a database in data set IN2 can be used to access information. The foreign key in data set IN1 can reference the primary key.

In this instance, a link is present between the two tables, data set IN1 and data set IN2. The presence of this link can indicate a potential cross-vulnerability. In this example, a dataflow can use a zip code in data set IN1 and income information in data set IN2 to group customers. If the policy is that social security numbers cannot be transmitted without encryption, a cross-vulnerability is present in which a transformation compute node is needed to encrypt data from data set IN1.

Figure 5:
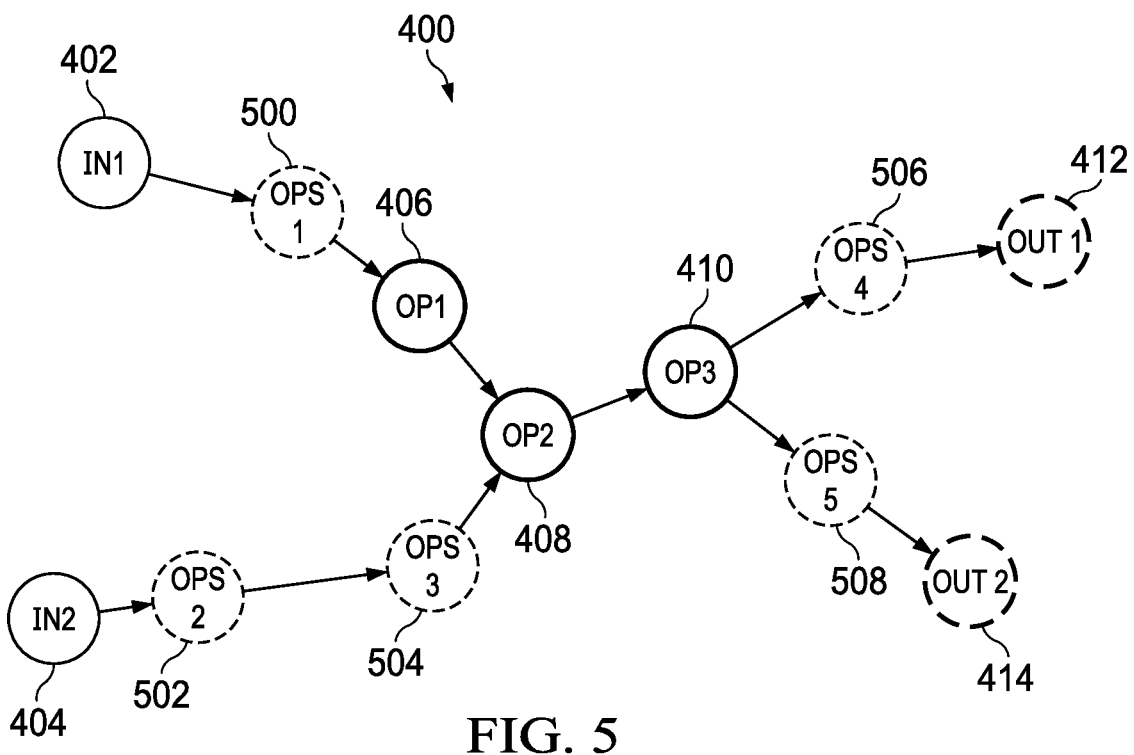
FIG. 5 is an illustration of a dataflow in a computer system that has been rewritten to enforce a policy in accordance with an illustrative embodiment.

With reference next to FIG. 5, an illustration of a dataflow in a computer system that has been rewritten to enforce a policy is depicted in accordance with an illustrative embodiment. In this illustrative example, an application of a policy results in identifying transformation compute nodes that are added to dataflow 400 to enforce the policy applied to dataflow 400. As depicted, the transformation compute nodes comprise OPS1 node 500, OPS2 node 502, OPS3 node 504, OPS4 node 506, and OPS5 node 508. As depicted, these transformation compute nodes are located between the source data nodes, IN1 node 402 and IN2 node 404, and the terminal data nodes, OUT1 412 and OUT2 414.

As depicted, OPS1 node 500, OPS4 node 506, and OPS5 node 508 are down stream of IN1 node 402, and OPS2 node 502, OPS3 node 504, OPS4 node 506, and OPS5 node 508 are downstream of IN2 node 404. In the depicted example, OPS1 node 500, OPS2 node 502, OPS3 node 504, and OPS4 node 506 are upstream of OUT 1 node 412 and OPS1 node 500, OPS2 node 502, OPS3 node 504, and OPS5 node 508 are upstream of OUT2 node 414.

In this illustrative example, OPS1 node 500 is directly downstream of IN1 node 402 because OPS1 node 500 is between IN1 node 420 of the computation nodes. OPS2 node 502 and OPS3 node 504 are directly downstream of IN2 node 404 because OPS2 node 502 and OPS3 node 504 are between IN2 node 404 and the computation nodes.

As depicted, OPS4 node 506 is directly upstream of OUT 1 node 412 because OPS4 node 506 is between OUT 1 node 412 and the computations nodes. OPS5 node 508 is directly upstream of OUT2 node 414 because OPS5 node 508 is between OUT2 node 414 and the computation nodes.

Dataflow 400 has been rewritten at runtime prior to execution of dataflow 400 to enforce a policy. As depicted, the data set IN1 in IN1 node 402 flows though OPS1 node 500, OP1 node 406, OP2 node 408, OP3 node 410, and OPS4 node 506 to reach OUT1 node 412. The data set IN1 in IN1 node 402 flows though OPS1 node 500, OP1 node 406, OP2 node 408, OP3 node 410, and OPS5 node 508 to reach OUT2 node 414.

As depicted, the data set IN2 in IN2 node 404 flows through OPS2 node 502, OPS3 node 504, OP2 node 408, OP3 node 410, and OPS4 node 506 to reach OUT1 node 412. The data set IN2 in IN2 node 404 also flows through OPS2 node 502, OPS3 node 504, OP2 node 408, OP3 node 410, and OPS5 node 508 to reach OUT2 node 414.

Dataflow 400 can then be executed transparently with the policy being enforced without the user knowing about the modifications to dataflow 400 or providing input for modifications to dataflow 400.

The illustration of dataflow 400 in FIG. 4 and FIG. 5 have been provided for purposes of illustrating one manner in which a dataflow can be implemented and modified to enforce a policy. This illustration is not meant to limit the manner in which other dataflows can be implemented for modified to enforce a policy. For example, other dataflows may enforce more than one policy. In yet another illustrative example, a transformed node can be located between two computations nodes, such as between OP2 408 and OP3 410.

Figure 6:
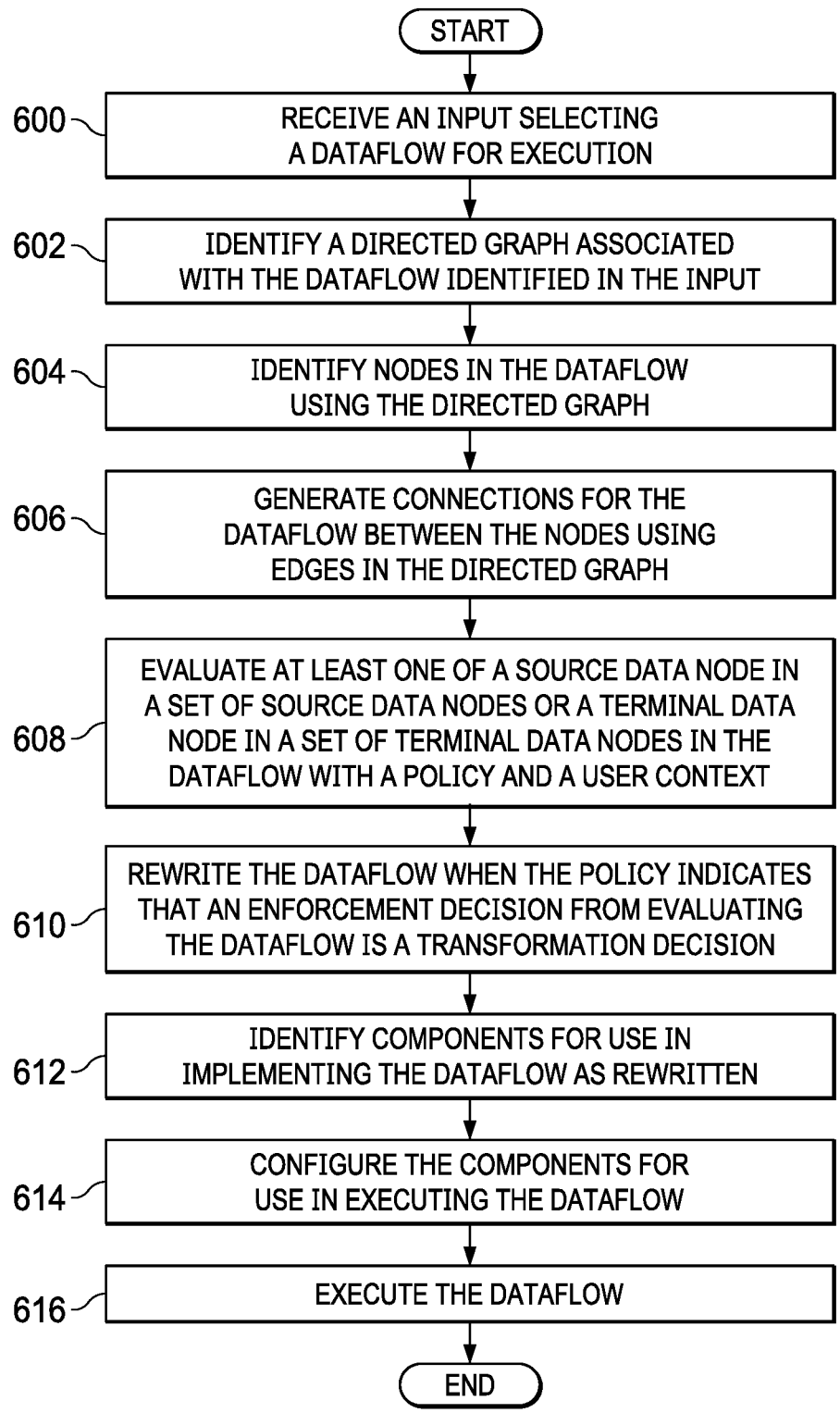
FIG. 6 is a flowchart of a process for executing a dataflow in accordance with an illustrative embodiment.

FIG. 6 is a flowchart of a process for executing a dataflow depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in dataflow adapter 306 in computer system 304 in FIG. 3. This process can be initiated for executing dataflows such as dataflow 503 in FIG. 5.

The process begins by receiving an input selecting a dataflow for execution (step 600). In step 600, the input selecting the dataflow can be received in a number of ways. For example, the selection can be received as user input generated by a user, an input generated by a script, an input generated by a program, or some other source for selections. The input can be a name or some other identifier for the selected dataflow. The input selecting the dataflow can also include a user identifier and context for the dataflow selected for execution.

The process identifies a directed graph associated with the dataflow identified in the input (step 602). In this illustrative example, the directed graph is a logical representation of the dataflow. The directed graph can be one of directed graphs 546 in directed graph database 548 in FIG. 5. For example, the identifier used for the dataflow can be used as a primary key to search for the directed graph in directed graph database 548.

Next, nodes in the dataflow are identified using the directed graph (step 604). In this illustrative example, the nodes include a set of source data nodes, a set of terminal data nodes, and a set of computation nodes. These nodes can be identified based on the vertices in the directed graph. The vertices correspond to different nodes in the dataflow. The process then generates connections for the dataflow between the nodes using edges in the directed graph (step 606). In this illustrative example, the edges can indicate a direction of dataflow as well which nodes are connected to each other.

The process evaluates at least one of the source data node in the set of source data nodes or the terminal data node in the set of terminal data nodes in the dataflow with a policy and a user context (step 608). In this illustrative example, the dataflow is evaluated at runtime prior to execution of the dataflow. The process then rewrites the dataflow when the policy indicates that an enforcement decision from evaluating the dataflow is a transformation decision (step 610). In step 610, one or more transformation compute nodes are added to enforce the policy for the dataflow.

The process identifies components for use in implementing the dataflow as rewritten (step 612). The process then configures the components for use in executing the dataflow (step 614). The process then executes the dataflow (step 616). The process terminates thereafter.

Figure 7:
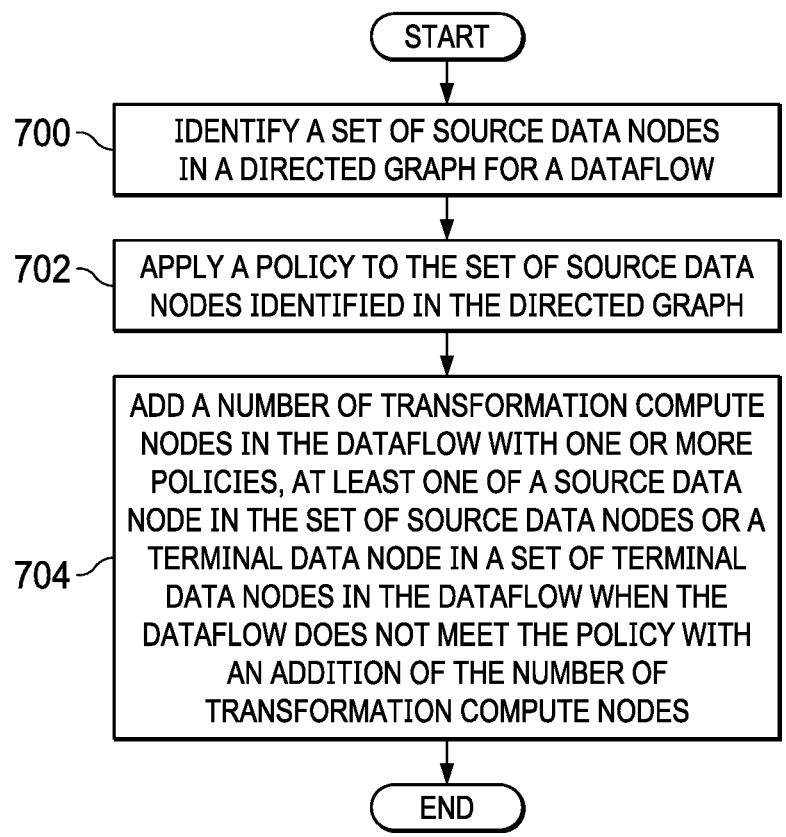
FIG. 7 is a flowchart of a process for adapting a dataflow in accordance with an illustrative embodiment.

Turning next to FIG. 7, a flowchart of a process for adapting a dataflow is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in dataflow adapter 306 in computer system 304 in FIG. 3.

The process begins by identifying a set of source data nodes in a directed graph for a dataflow (step 700). In step 700, the dataflow in the directed graph includes a set of computation nodes and a set of terminal data nodes. The set of computation nodes is located between the set of source data nodes and the set of terminal data nodes in the dataflow and performs operations on data flowing from the set of source data nodes in the dataflow.

The process applies a policy to the set of source data nodes identified in the directed graph (operation 702). The process adds a number of transformation compute nodes in the dataflow with one or more policies, at least one of a source data node in the set of source data nodes or a terminal data node in a set of terminal data nodes in the dataflow when the dataflow does not meet the policy without an addition of the number of transformation compute nodes (step 704). The process terminates thereafter. The number of transformation compute nodes are a portion of the set of computation nodes that perform the operations on the data to enforce the policy for the computer system.

Figure 8:
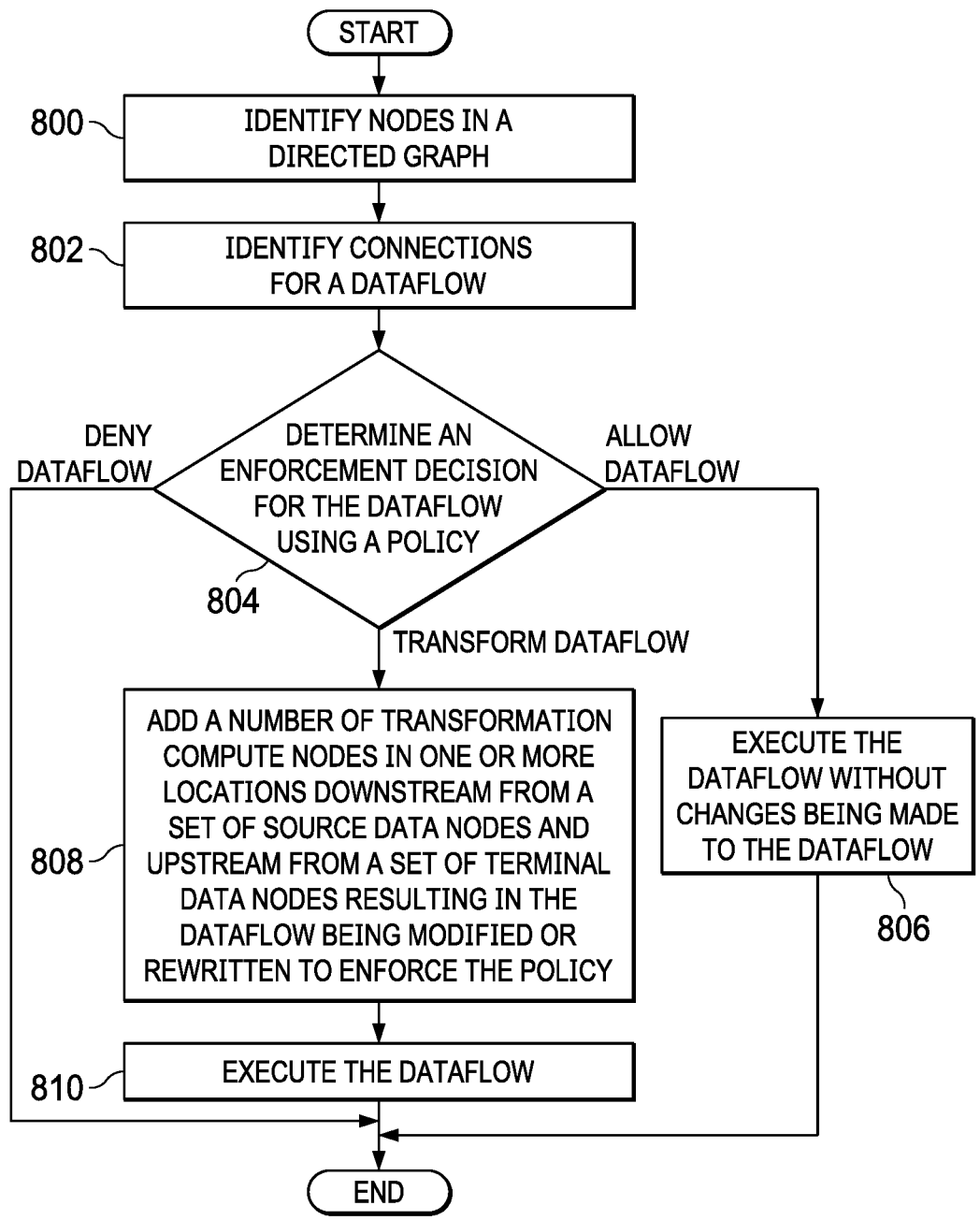
FIG. 8 is a more detailed flowchart of a process for adapting dataflow in accordance with an illustrative embodiment.

With reference next to FIG. 8, a more detailed flowchart of a process for adapting a dataflow is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in dataflow adapter 306 in computer system 304 in FIG. 3. The process in this figure can be applied to convert a dataflow described by a directed graph into components that implement the dataflow in a manner that also enforces a policy for the computer system.

The process begins by identifying nodes in a directed graph (step 800). In step 800, the nodes include one or more source data nodes, computation nodes, and terminal data nodes. These nodes correlate to vertices in the directed graph. The identification of the nodes includes identifying components used to implement the nodes in a computer system in which the dataflow is to be executed.

The process then identifies connections for a dataflow (step 802). In step 802, the connections are identified from edges connecting vertices in the directed graph. These edges also indicate flow of data between the nodes represented by the vertices.

The process determines an enforcement decision for the dataflow using a policy (step 804). In step 804, the enforcement decision can be to allow the dataflow, deny the dataflow, or transform the dataflow. When the enforcement decision is that the dataflow is allowed, the process executes the dataflow without changes being made to the dataflow (step 806). The process terminates thereafter. When the enforcement decision in step 804 is that the dataflow is denied, the process terminates without executing the dataflow.

With reference again to step 804, when the enforcement decision is to transform the dataflow, the process adds a number of transformation compute nodes in one or more locations downstream from a set of source data nodes and upstream from a set of terminal data nodes resulting in the dataflow being modified or rewritten to enforce the policy (step 808). In step 808, additional components are added to implement the transformation compute nodes with connections to at least one of a source data node, a computation data node, or a terminal data node. The process executes the dataflow (step 810). The process terminates thereafter.

Figure 9:
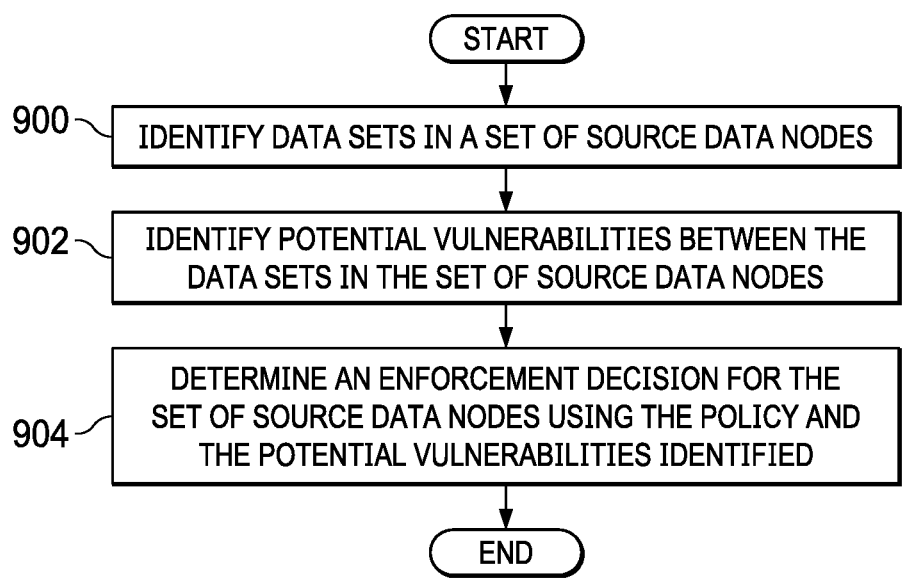
FIG. 9 is a flowchart of a process for applying a policy in accordance with an illustrative embodiment.

Turning next to FIG. 9, a flowchart of a process for evaluating a dataflow is depicted in accordance with an illustrative embodiment. The process in FIG. 9 is an example of one implementation for step 702 in FIG. 7.

The process begins by identifying data sets in a set of source data nodes (step 900). In step 900, a data set is a collection of related, discrete items of related data that may be accessed individually or in combination or managed as a whole entity. A data set can be organized using a data structure, such as a database. With a database, a data set can be, for example, a collection of customer data. This customer data can comprise names, contact information, prior purchases, address information, and other suitable information. As another illustrative example, a database can be considered a data set, as can bodies of data within a database related to a particular type of information, such as address information for customers, sales data for a corporate department, or other groupings of data.

The process identifies potential vulnerabilities between the data sets in the set of source data nodes (step 902). Step 902 can be performed in a number of different ways. For example, the data sets in the set of source data nodes can be profiled ahead of time before the dataflow is executed at runtime to determine vulnerabilities. The profiling can include a deep analysis of the data sets in the source data nodes.

This analysis can identify common data sets that may have cross vulnerabilities. For example, a primary key in a table in a database in a source data node can be used to access information. A foreign key in another table in the database can reference the primary key. In this instance, a link is present between the data sets in these two tables. The link between the tables can result in a cross vulnerability for the data sets in which information can be accessed by a foreign key that does not meet a policy.

Whether the common data sets are considered vulnerable can be determined using the policy. As a result, the identification of the common data sets allows the policy to be applied to all data that could be accessed.

The process determines an enforcement decision for the set of source data nodes using the policy and the potential vulnerabilities identified (step 904). The process terminates thereafter. In this example, an enforcement decision to transform the dataflow results in the process proceeding to step 704 in FIG. 7.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
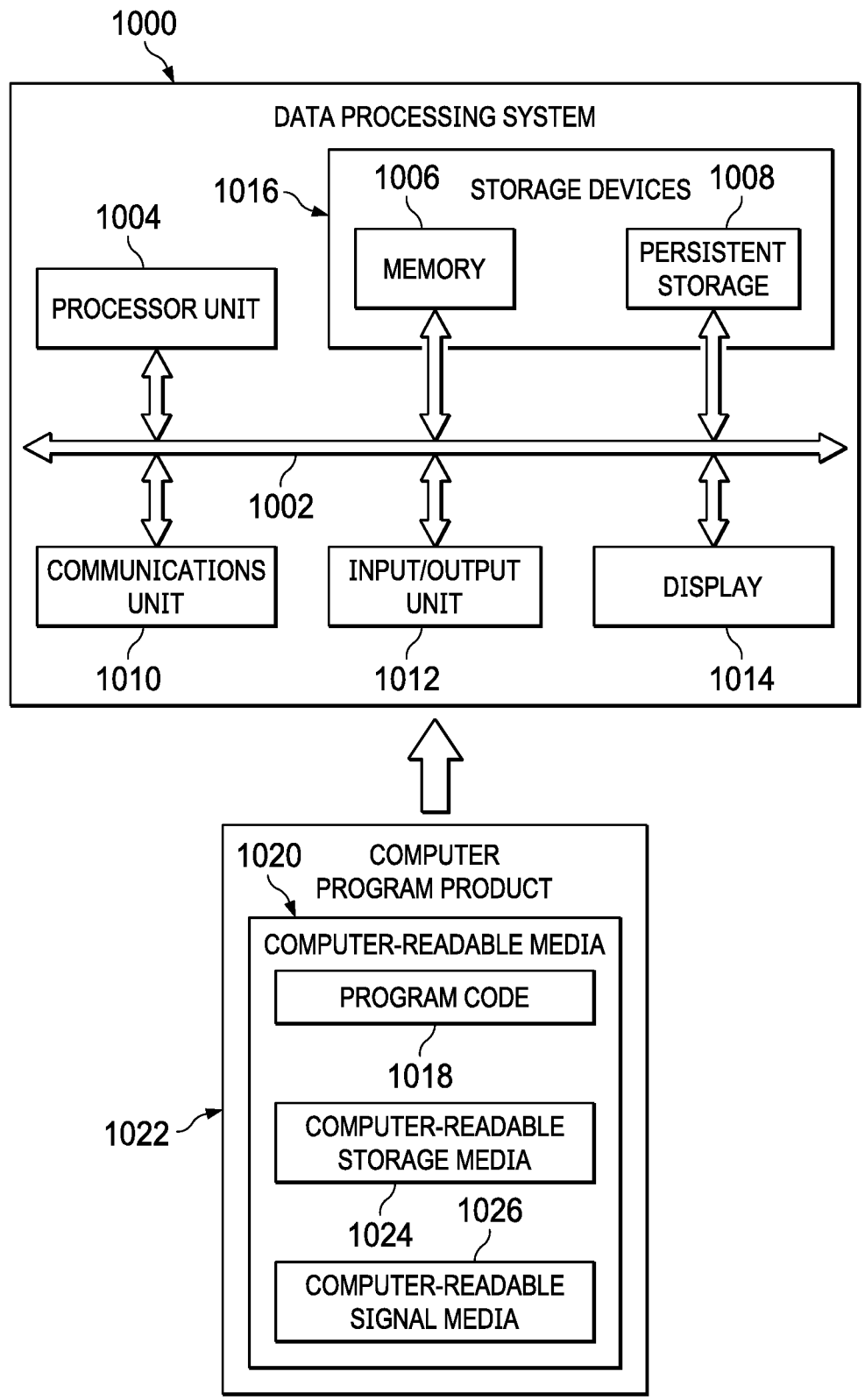
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement computer system 304 in FIG. 3. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Thus, the illustrative embodiments of the present invention provide a computer implemented method, a computer system, and a computer program product for adapting dataflows to enforce policies. A set of source data nodes in a directed graph for a dataflow is identified by a computer system. A set of computation nodes is located between the set of source data nodes and a set of terminal data nodes in the dataflow, and performs operations on data flowing from the set of source data nodes in the dataflow. A policy is applied by the computer system to the set of source data nodes identified in the directed graph. A number of transformation compute nodes is added in the dataflow with one or more policies, at least one of a source data node in the set of source data nodes or a terminal data node in the set of terminal data nodes in the dataflow by the computer system. The addition of the number of transformation compute nodes is performed when the dataflow does not meet the policy without an addition of the number of transformation compute nodes. In the illustrative example, the number of transformation compute nodes is a portion of the set of computation nodes that perform the operations on the data to enforce the policy for the computer system.

In one illustrative example, a policy is automatically applied to a dataflow without a need for user input. As a result, a user can select a dataflow from a database or other collection of dataflows for processing data without needing to know or apply one or more policies that may be in effect for the dataflow. As a result, the illustrative example reduces workloads on users as well as enforcing a policy in the computer system. For example, an illustrative example can enforce polices such as those relating to data protection, security, privacy, and other policies in a manner that does not require user input and avoids a preprocessing step that prepares inputs to the dataflow. Further, the illustrative example enables automatically modifying a dataflow based on the use of the dataflow for different users, and datasets may be subject to the different policies that are in effect at the time the dataflow is executed.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for adapting a dataflow, the method comprising:
   identifying, by a computer system, a set of source data nodes, a set of terminal data nodes, and a set of computation nodes located between the set of source data nodes and the set of terminal data nodes in the dataflow from a directed graph representing the dataflow, wherein the set of computation nodes performs operations on data flowing from the set of source data nodes in the dataflow;
   evaluating, by the computer system, the dataflow with one or more policies, at least one of a source data node in the set of source data nodes or a terminal data node in the set of terminal data nodes, and a user context;
   rewriting the dataflow, at runtime, by adding, by the computer system, a number of transformation compute nodes in a number of locations selected from at least one of downstream of the source data node in the set of source data nodes or upstream of the terminal data node the set of terminal data nodes in the dataflow when the dataflow does not meet the one or more policies without an addition of the number of transformation compute nodes, wherein the number of transformation compute nodes are a portion of the set of computation nodes that perform the operations on the data to enforce the one or more policies in the computer system; and
   executing, by the computer system, the dataflow such that the data flows from the set of source data nodes to the set of terminal data nodes, wherein the data is processed during the execution by the number of transformation compute nodes such that the one or more policies is enforced with respect to the data and wherein preprocessing of the data in the set of source data nodes is unnecessary.

2. The method of claim 1, wherein the user context comprises a user of the dataflow and information about a connection to the dataflow identified from the set of terminal data nodes.

3. The method of claim 1, wherein evaluating, by the computer system, with the one or more policies, the at least one of the source data node in the set of source data nodes or the terminal data node in the set of terminal data nodes, and the user context comprises:
   determining, by the computer system, an enforcement decision for the dataflow using the one or more policies; and
   wherein adding, by the computer system, the number of transformation compute nodes in the number of locations selected from the at least one of downstream of the source data node in the set of source data nodes or upstream of the terminal data node in the set of terminal data nodes in the dataflow when the dataflow does not meet the one or more policies without the addition of the number of transformation compute nodes, wherein the number of transformation compute nodes operate to enforce the one or more policies for the computer system comprises:
   adding, by the computer system, the number of transformation compute nodes in the number of locations selected from the at least one of downstream of the source data node in the set of source data nodes or upstream of the terminal data node in the set of terminal data nodes in the dataflow when the enforcement decision is to transform data to meet the one or more policies.

4. The method of claim 3, wherein evaluating, by the computer system, the dataflow with one or more policies, at least one of the source data node in the set of source data nodes or the terminal data node in the set of terminal data nodes, and the user context further comprises:
   identifying, by the computer system, data sets in the set of source data nodes;
   identifying, by the computer system, potential vulnerabilities between the data sets in the set of source data nodes; and determining, by the computer system, the enforcement decision for the set of source data nodes using the one or more policies and the potential vulnerabilities identified.

5. The method of claim 4, wherein identifying the potential vulnerabilities between the data sets comprises:
identifying, by the computer system, the potential vulnerabilities between the data sets in the set of source data nodes using an enforcement knowledge graph for the set of source data nodes in which common data sets in the data sets in the set of source data nodes with common keys are identified in the enforcement knowledge graph, wherein the common data sets with the common keys have the potential vulnerabilities.

6. The method of claim 1, wherein identifying, by the computer system, the set of source data nodes in the directed graph for representing the dataflow; evaluating, by the computer system, the dataflow with one or more policies, at least one of the source data node in the set of source data nodes or the terminal data node in the set of terminal data nodes, and the user context; and adding, by the computer system, the number of transformation compute nodes between the set of source data nodes and the set of terminal data nodes in the dataflow when the dataflow does not meet the one or more policies without the addition of the number of transformation compute nodes is performed at a run time before execution of the dataflow in the computer system.

7. The method of claim 1, wherein adding, by the computer system, the number of transformation compute nodes in a number of locations selected from at least one of downstream of the source data node in the set of source data nodes or upstream of the terminal data node in the set of terminal data nodes in the dataflow when the dataflow does not meet the one or more policies without the addition of the number of transformation compute nodes, wherein the number of transformation compute nodes operate to enforce the one or more policies for the set of source data nodes comprises:
adding, by the computer system, the number of transformation compute nodes as a set of logical transformation compute nodes; and
converting, by the computer system, the set of logical transformation compute nodes into a set of physical transformation compute nodes at a runtime.

8. The method of claim 1, wherein the one or more policies relates to at least one of security, computer resource usage, privacy, confidentiality, or a company one or more policies.

9. A policy enforcement system comprising:
a computer system comprising a processor that operates to:
identify a set of source data nodes, a set of terminal data nodes, and a set of computation nodes located between the set of source data nodes and the set of terminal data nodes in the dataflow from a directed graph representing the dataflow, wherein the set of computation nodes performs operations on data flowing from the set of source data nodes in the dataflow;
evaluate the dataflow with one or more policies, at least one of the source data node in the set of source data nodes or the terminal data node in the set of terminal data nodes, and a user context;
rewrite the dataflow, at runtime, by adding a number of transformation compute nodes in a number of locations selected from at least one of downstream of the source data node in the set of source data nodes or upstream of the terminal data node in the set of terminal data nodes in the dataflow when the dataflow does not meet the one or more policies without an addition of the number of transformation compute nodes, wherein the number of transformation compute nodes are a portion of the set of computation nodes that perform the operations on the data to enforce the one or more policies for the computer system; and
execute the dataflow such that the data flows from the set of source data nodes to the set of terminal data nodes, wherein the data is processed during the execution by the number of transformation compute nodes such that the one or more policies is enforced with respect to the data and wherein preprocessing of the data in the set of source data nodes is unnecessary.

10. The policy enforcement system of claim 9, wherein the user context comprises a user of the dataflow and information about a connection to the dataflow identified from the set of terminal data nodes.

11. The policy enforcement system of claim 9, wherein in evaluating the dataflow with the one or more policies, the at least one of the source data node in the set of source data nodes or the terminal data node in the set of terminal data nodes, and the user context, the computer system operates to:
determine an enforcement decision for the dataflow using the one or more policies;
wherein in adding the number of transformation compute nodes in the number of locations selected from the at least one of downstream of the source data node in the set of source data nodes or upstream of the terminal data node in the set of terminal data nodes in the dataflow when the dataflow does not meet the one or more policies without the addition of the number of transformation compute nodes, wherein the number of transformation compute nodes operates to enforce the one or more policies for the dataflow, the computer system operates to:
add the number of transformation compute nodes in the number of locations selected from the at least one of downstream of the source data node in the set of source data nodes or upstream of the terminal data node in the set of terminal data nodes in the dataflow when the enforcement decision is to transform data to meet the one or more policies.

12. The policy enforcement system of claim 11, wherein in evaluating the dataflow with one or more policies, at least one of the source data node in the set of source data nodes or the terminal data node in the set of terminal data nodes, the user context, the computer system further operates to:
identify data sets in the set of source data nodes;
identify potential vulnerabilities between the data sets in the set of source data nodes; and
determine the enforcement decision for the set of source data nodes using the one or more policies and the potential vulnerabilities identified.

13. The policy enforcement system of claim 12, wherein identifying the potential vulnerabilities between the data sets comprises:
identifying the potential vulnerabilities between the data sets in the set of source data nodes using an enforcement knowledge graph for the set of source data nodes in which common data sets in the data sets in the set of source data nodes with common keys are identified in the enforcement knowledge graph, wherein the common data sets with the common keys have the potential vulnerabilities.

14. The policy enforcement system of claim 9, wherein the computer system operates to identify the set of source data nodes, the set of terminal data nodes, and the set of computation nodes located between the set of source data nodes and the set of terminal data nodes in the dataflow from the directed graph representing the dataflow; evaluate the dataflow with the one or more policies, the at least one of the source data node in the set of source data nodes or the terminal data node in the set of terminal data nodes, and the user context; and in the number of locations selected from the at least one of downstream of the source data node in the set of source data nodes or upstream of the terminal data node in the set of terminal data nodes in the dataflow when the dataflow does not meet the one or more policies without the addition of the number of transformation compute nodes at a run time before execution of the dataflow in the computer system.

15. The policy enforcement system of claim 9, wherein in adding the number of transformation compute nodes in the number of locations selected from the at least one of downstream of the source data node in the set of source data nodes or upstream of the terminal data node in the set of terminal data nodes in the dataflow when the dataflow does not meet the one or more policies without the addition of the number of transformation compute nodes, wherein the number of transformation compute nodes operate to enforce the one or more policies for the set of source data nodes, the computer system operates to:
    add the number of transformation compute nodes as a set of logical transformation compute nodes; and
    convert the set of logical transformation compute nodes into a set of physical transformation compute nodes at a runtime.

16. A computer program product for adapting a dataflow, the computer program product comprising:
    a computer-readable storage media;
    first program code, stored on the computer-readable storage media, configured for identifying a set of source data nodes, a set of terminal data nodes, and a set of computation nodes located between the set of source data nodes and the set of terminal data nodes in the dataflow from a directed graph for, wherein the set of computation nodes performs operations on data flowing from the set of source data nodes in the dataflow;
    second program code, stored on the computer-readable storage media, configured for evaluating the dataflow with one or more policies, at least one of a source data node in the set of source data nodes or a terminal data node in the set of terminal data nodes, and a user context;
    third program code, stored on the computer-readable storage media, configured for rewriting the dataflow, at runtime, by adding a number of transformation compute nodes in a number of locations selected from at least one of downstream of the source data node in the set of source data nodes or upstream of the terminal data node in the set of terminal data nodes in the dataflow when the dataflow does not meet the one or more policies without an addition of the number of transformation compute nodes, wherein the number of transformation compute nodes are a portion of the set of computation nodes that perform the operations on the data to enforce the one or more policies for a computer system; and
    fourth program code, stored on the computer-readable storage media, configured for executing the dataflow such that the data flows from the set of source data nodes to the set of terminal data nodes, wherein the data is processed during the execution by the number of transformation compute nodes such that the one or more policies is enforced with respect to the data and wherein preprocessing of the data in the set of source data nodes is unnecessary.

17. The computer program product of claim 16, wherein the user context comprises a user of the dataflow and information about a connection to the dataflow identified from the set of terminal data nodes.

* * * * *